Dec. 10, 1968    R. M. PROW    3,414,978
SCALING APPARATUS
Filed Oct. 7, 1966    2 Sheets-Sheet 1
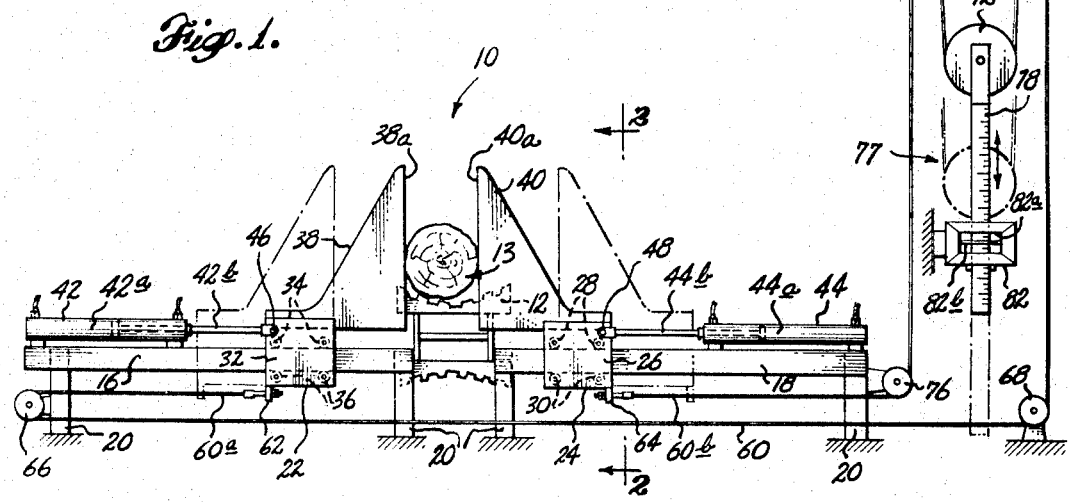
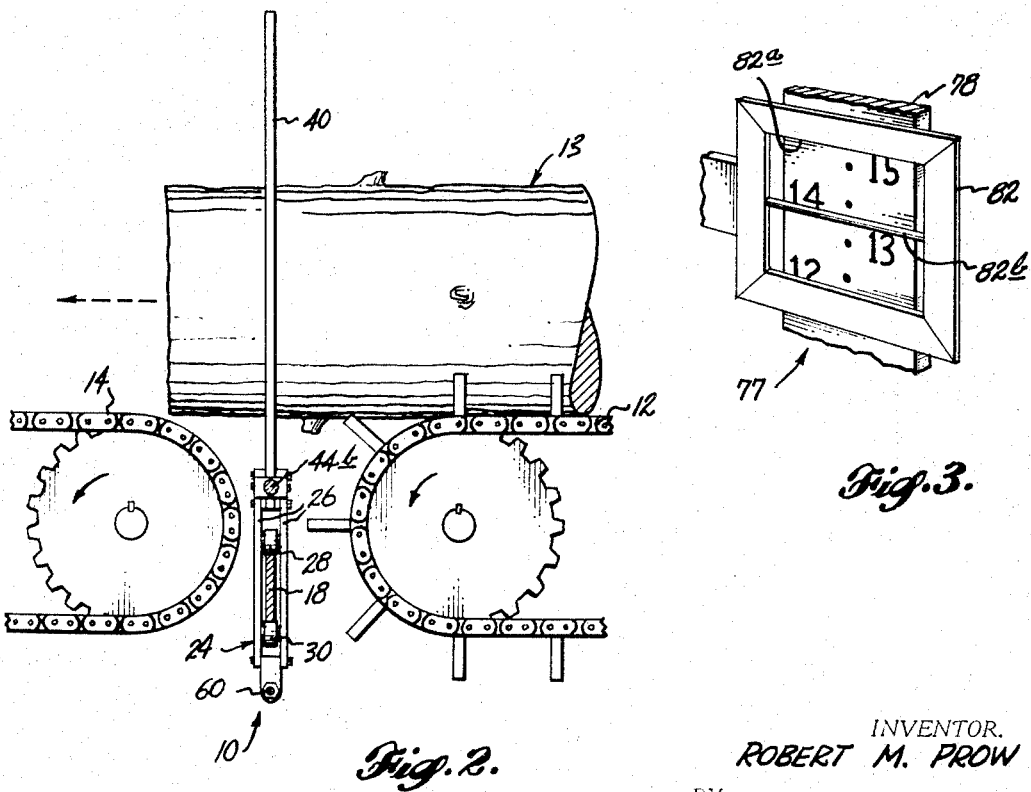
INVENTOR.
ROBERT M. PROW
BY
Kolisch + Hartwell
ATTORNEYS Dec. 10, 1968  R. M. PROW  3,414,978
SCALING APPARATUS
Filed Oct. 7, 1966  2 Sheets-Sheet 2

INVENTOR.
ROBERT M. PROW
BY
Kolisch + Hartwell
ATTORNEYS

United States Patent Office 3,414,978
Patented Dec. 10, 1968

3,414,978
SCALING APPARATUS
Robert M. Prow, 1150 Rogue River Highway,
Grants Pass, Oreg. 97526
Filed Oct. 7, 1966, Ser. No. 585,189
2 Claims. (Cl. 33—143)

ABSTRACT OF THE DISCLOSURE

Apparatus for measuring the width of an elongated workpiece such as a log including opposed, relatively movable caliper arms that are adapted to come against opposite sides of the log with such at rest in the apparatus, a cable interconnecting the caliper arms extending between the caliper arms, and a measurement indicator acted upon by the cable adapted to indicate the distance between the arms.

---

This invention relates to apparatus for scaling an elongated workpiece, as by measuring the width thereof.

Such apparatus may find use in a lumber mill, where logs prior to their being cut up or otherwise processed have their diameters measured, commonly af.er they leave a barker where bark is removed from the logs. Logs are not absolutely straight, for instance they may be crooked or otherwise deformed. Because of this characteristic, and because logs normally have some size (which introduces certain problems in handling them), it is difficult rapidly to position a log in any scaling station with the center axis of that region of the log which is being measured occupying any exact predetermined position relative to the scaling station. As a consequence, log diameter measurements have either been taken with portable apparatus, which may be time consumming, or when taken with equipment which is a permanent part of the scaling station, have been subject to some inaccuracies because of miscentering of the measured region.

Thus, a general object of this invention is to provide novel scaling apparatus facilitating the exact measurement of log diameters in a scaling station.

More specifically, an object of this invention is to provide such apparatus which does not require that the center of the log in the region measured have any exact predetermined position relative to the scaling apparatus.

Another object is to provide such apparatus which includes a pair of opposed movable caliper arms, which may be moved into engagement with opposite sides of a log or other workpiece, and measurement indicating means operatively connected to such arms indicating the relative spacing between the arms without regard to the particular positions that the arms occupy in the scaling station of which the arms are a part. More specifically, the invention contemplates novel means interconnecting the arms and the indicating means, including compensating apparatus which operates to compensate for like movement of the two arms to one side or the other of the scaling station.

A further object is to provide apparatus of the type described which is relatively simple, reliable and trouble free.

Another object is to provide apparatus of the type described so constructed as to enable workpieces, such as logs, to be fed endwise into the scaling station in the apparatus.

A further object of the invention is to provide such apparatus where movement of a workpiece, such as a log, into the scaling station is accomplished by shifting the log laterally, with a caliper arm in the apparatus moving out of an operative position to accommodate such movement.

These and other objects and advantages attained by the invention will become more fully apparent as the description which follows is read in conjunction with the accompanying drawings, wherein:

FIG. 1 is a front elevation illustrating scaling apparatus as contemplated herein;

FIG. 2 is an enlarged cross-sectional view, taken generally along the line 2—2 in FIG. 1;

FIG. 3 is a perspective view, illustrating portions of means for producing a measurement indication in the apparatus of FIGS. 1 and 2;

Figure 4:
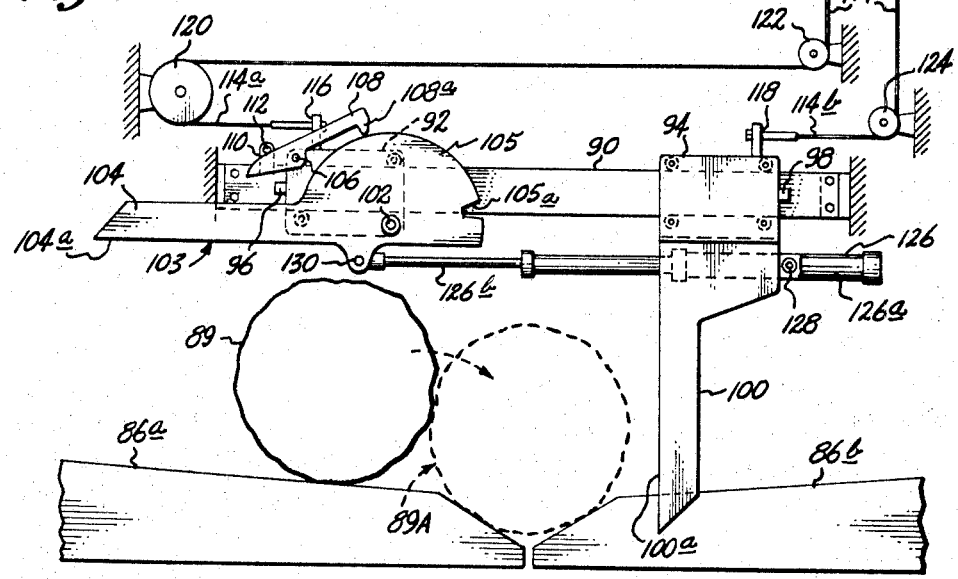
FIG. 4 is a front elevation illustrating a modification of the invention.

In the drawings, apparatus is illustrated such as may be used in measuring the width, or diameter, of logs in a lumber mill. It should be understood, however, that the apparatus may equally well be employed in measuring the widths of other elongated workpieces.

Turning now to the drawings, and with reference first to FIGS. 1, 2 and 3, indicated generally at 10 is the scaling station of scaling apparatus as contemplated herein. Positioned closely adjacent the rear of the apparatus is the off-bearing end of a log-haul chain 12 which is power driven (by means not shown) to direct logs, such as log 13, to the apparatus. At 14, adjacent the front of apparatus 10, is a suitable conveyor which may be used to carry logs away from the apparatus after they have been measured. The logs moved endo through the apparatus.

At laterally opposite sides of the apparatus, and extending transversely thereof, are laterally-spaced, substantially horizontal, collinear rails 16, 18. The rails are suitably mounted on top of supports 20.

Mounted for movement along rails 16, 18, and referred to herein collectively with the rails as mounting structure, are carriages 22, 24, respectively. Considering carriage 24, it comprises a pair of upright, spaced-apart, opposed, rectangular plates 26 which are disposed closely adjacent the front and rear faces of rail 18, as can be seen best in FIG. 2. Journaled in suitable bearings mounted on plates 26, and located between the plates, are upper and lower pairs of rollers, 28, 30, respectively. Rollers 28, 30 bear against upper and lower edges, respectively, of rail 18 accommodating movement of the carriage along the rail, and providing rolling contact between the carriage and the rail.

Carriage 22 is constructed in substantially the same manner as carriage 24 with plates, such as plate 32, corresponding to plates 26, and pairs of rollers 34, 36 corresponding to pair of rollers 28, 30, respectively.

Suitably mounted as by welding adjacent the tops of carriages 22, 24 between the plates are caliper arms 38, 40, respectively, having opposed, substantially vertical edges 38a, 40a, respectively. The caliper arms occupy a substantially common vertical plane extending transversely of the apparatus, and are adapted to move toward and away from one another in such plane with movement of the carriages along the rails. In solid outline, the caliper arms are shown in positions where they are relatively close together with their opposing edges engaging opposite sides of log 13. In dashed outline, the arms are shown in positions where they are relatively far apart.

Means for shifting the arms toward and away from each other is provided comprising a pair of air-operated, double-acting rams 42, 44. Ram 42 has its cylinder 42a suitably mounted on top of rail 16, and its rod 42b connected at 46 to carriage 22. Cylinder 44a of ram 44 is suitably mounted on top of rail 18, and rod 44b of the ram is connected at 48 to carriage 24. The rams are connected for independent operation to a suitable source of air under pressure. Upon extension, the rams cause the caliper arms to move toward each other, and upon contraction, the rams cause the arms to move apart.

At 60 is an elongated tensioning element, or cable, having opposite ends or extremities, 60a, 60b connected by means of fasteners 62, 64 to carriages 22, 24, respectively. Training the cable between its ends is a compensating pulley assembly including, progressing along the cable from end 60a to end 60b, pulleys 66, 68, 70, 72, 74, and 76. Pulleys 66, 68, 70, 74 and 76 are suitably fixed in place relative to the rails of the apparatus. Pulley 72, however, is not fixed in place, but rather is suspended on the portion of cable 60 which extends between pulleys 70, 74.

Shown generally at 77 is measurement indicating means as contemplated herein comprising an elongated calibrated bar, or indicating element, 78 pivotally mounted on and depending from pulley 72. The lower end of element 78 extends down behind an indicating assembly 82 which is suitably fixed in position relative to rails 16, 18. Assembly 82 includes a window 82a, through which the portion of element 78 located directly behind the assembly is visible, and an elongated thin reference bar 82b extending substantially horizontally across the window. Viewing element 78 through window 82a, the bar's calibrations are so arranged that the position of the element relative to reference bar 82b gives an indication of the exact spacing between the caliper arms.

In solid outline, pulley 72 and element 78 are shown in the positions which they occupy relative to assembly 82 with the caliper arms disposed against opposite sides of log 13. In dashed outline, the pulleys and element are shown in the positions which they occupy with the caliper arms occupying the positions where they are shown in dashed outline.

Considering how measurement indicating means 77 operates to indicate the spacing between arms 38, 40, when changes occur in the relative spacing between the caliper arms, and hence in the spacing between the ends of cable 60, proportional changes also take place in the length of the portion of cable 60 which extends between pulleys 70, 74 and around pulley 72. More specifically, with a reduction of the spacing between the caliper arms, there is a reduction in the length of the portion of the cable extending between pulleys 70, 74, and with an increase in the spacing between the arms, there is an increase in the length of this portion of the cable.

Such action of the cable between pulleys 70, 74 results, in turn, in a vertical adjustment in the position of element 78 relative to reference bar 82b, which adjustment is directly related to the change that occurred in the spacing between the arms. This adjustment results in the indicating means indicating the exact new spacing existing between the arms.

It should be noted that rails 16 and 18 constitute elongated rail means extending transversely of the log-haul chain 12 or conveyor, and such rail means is located in a position spaced vertically to one side of the elongated bed for supporting a log defined by the conveyor, i.e., below such bed. Further, line or cable 60 which interconnects the carriages mounted on this rail means includes an interconnecting reach which extends transversely of this conveyor and the bed defined thereby which is also spaced below such bed. In this way, the reach of line offers no impairment to a log supported on the conveyor regardless of log as such. The caliper arms are supported entirely on the carriages, and project from the rail means upwardly toward and past the bed defined by the conveyor, to unjoined, unsupported ends. In this way the arms offer minimal obstruction to proper positioning of a log or other workpiece between the arms.

Explaining how the apparatus described so far may be used in a lumber mill, a log, such as log 13, is fed on chain 12 endwise into the scaling station (along a line normal to the common plane of the caliper arms) to a position such as that shown in FIGS. 1 and 2 when it is stopped, it following that the log-haul chain or conveyor 12 is capable of intermittent operation. An operator then supplies air to rams 42, 44 causing the rams to expand whereby the opposing edges of the caliper arms are brought into engagement with opposite sides of the log. This is done without moving the log from the position which it occupies upon being stopped on entering the scaling station.

With the caliper arms engaging the log, its diameter may be read from indicating means 77. After the measurement is made, the rams are contracted to shift the arms away from the sides of the log, and the log is then carried away from the apparatus by off-bearing conveyor 14. Another log may then be moved into the station, and its diameter measured, again without regard to the lateral position of the log in the station.

Figure 5:
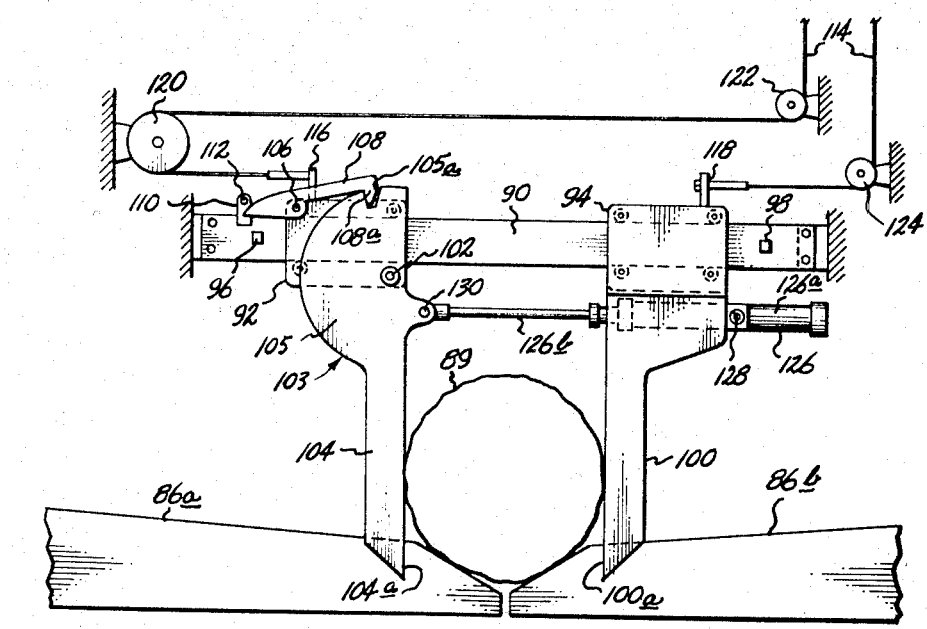
FIG. 5 is similar to FIG. 4, but illustrates parts of the apparatus in different positions.

Referring now to FIGS. 4 and 5 where a modification of the invention is shown, at 86a, 86b are a pair of base plates with upper surfaces sloping toward each other. The upper surface of plate 86a functions to direct logs, such as log 89, laterally into the apparatus, with the logs rolling on the plate to a position such as that shown at 89A for log 89, where it is supported by both plates.

Suitably mounted above the base plate is an elongated, transversely extending, longitudinal rail 90. At 92, 94 are carriages which are similar in construction to previously described carriages 22, 24, and these carriages are mounted for movement along rail 90 in substantially the same manner as carriages 22, 24 are mounted for movement along rails 16, 18. Rail 90 and carriages 92, 94 are referred to herein collectively as mounting structure. Mounted adjacent opposite ends of the rail are a pair of stops 96, 98 which function to limit the travel of carriages 92, 94, respectively, on the rail.

Suitably mounted on and depending from carriage 94 is an elongated caliper arm 100 having a substantially vertical edge 100a. Mounted on carriage 92 by means of a pivot connection 102 is a caliper member 103 having an elongated arm portion 104 and a mounting portion 105. The arm portion includes an edge 104a, and the mounting portion includes a notch 105a. In FIG. 4, caliper member 103 is shown in a position where arm 104 and edge 104a are substantially horizontal and extending to the left of pivot connection 102. In FIG. 5, the caliper member is shown in another position where arm 104 and edge 104a are substantially vertical and extending below pivot connection 102. Arm 100 and arm portion 104 occupy a substantially common vertical plane extending transversely of the apparatus.

Also mounted on carriage 92 by means of a pivot connection 106 is an elongated latch or latch means 108. Formed on the right-hand end of the latch is a downwardly projecting portion 108a which is adapted to fit into previously-mentioned notch 105a in caliper member 103. The latch is adapted to swing about pivot connection 106 whereby projection 108a moves into or out of the notch. In FIG. 5 the latch is shown in a position where its projection extends into the notch, and in FIG. 4 the latch is shown in another position where its projection is completely withdrawn from the notch. The latch is normally urged by gravity to the position shown in FIG. 5.

Mounted on top of rail 90 adjacent the left-hand end of the rail is an upright member 110 having an elongated horizontal finger 112, or releasing means, which projects over the top of the rail. Upon movement of carriage 92 toward stop 96, the left-hand end of latch 108 is adapted to pass beneath and engage finger 112 whereby the latch swings about pivot connection 106 with lifting of projection 108a.

At 114 is an elongated cable corresponding to previously described cable 60 having extremities 114a, 114b connected by suitable fasteners 116, 118 to carriages 92, 94, respectively. This cable is trained around suitable pulleys 120, 122, 124 which are fixed in position relative to rail 90 and which correspond to previously described pulleys 66, 68, 76, respectively. The reaches of cable 114 extending above pulleys 122, 124 correspond to the reaches of cable 60 which extend above pulleys 68, 76, respectively, and as with cable 60, cable 114 is connected to measurement indicating means similar in construction and operation to means 77 shown in FIG. 1.

Means for shifting arms 100, 104 toward and away from one another comprises an air-operated double-acting ram 126 having its cylinder 126a connected by a pivot connection 128 to arm 100, and having its rod 126b connected by a pivot connection 130 to mounting portion 105 of caliper member 103. The ram is suitably connected to a source of air under pressure.

Explaining now how the apparatus shown in FIGS. 4 and 5 operates, and assuming that arm 100 and caliper member 103 initially occupy positions similar to those shown in FIG. 5, air is supplied to ram 126 causing the ram is extend. This causes arm 100 and caliper member 103, and hence the carriages, to shift away from one another. No rotation of member 103 occurs since projection 108a of the latch extends into notch 105a. With further extension of the ram, carriage 94 moves against stop 98 whereupon its travel on the rail is stopped, and the left-hand end of latch 108 is moved beneath finger 112.

When this occurs, upon further extension of ram 126 and movement of carriage 92 toward stop 96, the latch is rotated to lift projection 108a out of notch 105a. When carriage 92 engages stop 96 whereupon its travel is stopped, further extension of the ram produces rotation of caliper member 103 to the position in which it is shown in FIG. 4. In this position of member 103, arm 104 is moved away from a region through which logs travel upon being directed into the apparatus, thus to provide clearance for such logs.

A log, such as log 89, is then fed sideways into the apparatus, with the log rolling on the top surface of base plate 86a along a line which is substantially parallel to the common plane of the caliper arms. The log stops in a position such as that indicated at 89A for log 89.

To measure the log's diameter, ram 126 is contracted whereupon member 103 rotates back to a position where arm portion 104 and edge 104a are substantially vertical. With further contraction of the ram, the arms and carriages move toward one another, latch 108 moves away from finger 112, and projection 108a drops back into notch 105a to prevent any further rotation of member 103. Contraction of the ram continues until the opposing edges of the caliper arms are disposed against opposite sides of the log. This is done without disturbing the position of the log in the apparatus.

With edges 100a, 104a against opposite sides of the log, the measurement indicating means to which cable 114 is connected indicates the exact relative spacing existing between the edges, and hence the diameter of the log. As in the case of the earlier-described embodiment, this measurement of the log's diameter is possible regardless of the exact position which the log occupies in the apparatus.

When such a measurement has been made, ram 126 may be extended somewhat to move the arms away from the sides of the log, and the log may be moved by any suitable conveyor means away from the apparatus.

It will be noted that in this modification of the invention, as in the first described, the caliper arms have an unjoined unsupported set of ends, a necessary requirement if one arm is to be swingable upwardly to the horizontal position, as shown in FIG. 4. Furthermore, the line or cable which interconnects the arms is vertically above the elongated bed defined by plates 86a, 86b, together with the rail 90 that mounts the carriages. This organization again minimizes problems in properly training the line.

Thus, the invention provides apparatus which greatly facilitates and speeds measuring the width of an elongated workpiece, such as a log. The invention is capable of modification to take care of feed of workpieces into the scaling station, either by endwise or lateral movement of the workpieces.

While modifications of the invention have been described herein, obviously changes and variations are possible without departing from the spirit of the invention. It is desired to cover all such changes and variations as would be apparent to one skilled in the art, and that come within the scope of the appended claims.

I claim:
1. Apparatus for scaling logs and the like comprising:
log-supporting means defining an elongated bed for supporting a log in a substantially horizontal position,
rail means extending transversely of said bed in a position elevated above said bed,
a pair of carriages movably mounted on said rail means for relative movement toward and away from each other therealong,
a pair of caliper arms mounted adjacent one set of their ends on said carriages, with one arm on each carriage, said arms projecting downwardly from said rail means to terminate in an opposite set of ends which are unsupported and unjoined, one of said caliper arms being pivotally supported adjacent its upper end on the carriage to permit the same to be swung away from the other caliper arm,
an elongated line interconnecting said carriages with a reach extending transversely of said bed and spaced above said bed,
measurement indicating means for producing measurement indication,
and a compensating pulley assembly training said line and operatively connected to said measurement indicating means producing measurement indications related to the spacing of the caliper arms.

2. Apparatus for scaling an elongated workpiece by measuring the width thereof comprising:
a pair of opposed, spaced-apart caliper arms, and structure mounting said arms with the arms movable on said structure toward and away from each other, said caliper arms occupying a substantially common plane,
measurement indicating means for producing measurement indication,
means interconnecting said caliper arms and said indicating means accommodating positioning of the caliper arms in different positions relative to said mounting structure wherein with the arms spaced the same distance apart from each other in such different positions relative to the mounting structure, said indicating means produces the same indication, which indication corresponds to the spacing of the caliper arms from each other,
and means for directing a workpiece to a position located between said arms with the workpiece moving in a direction which substantially parallels the plane of said arms,
the structure mounting said arms further including means whereby one of the arms may be moved away from the other to provide clearance for a workpiece when such is being moved into its said position between said arms.

References Cited
UNITED STATES PATENTS

| | | | |
|---|---|---|---|
| 365,113 | 6/1887 | Willard | 33—146 |
| 1,980,706 | 11/1934 | Sperry | 33—144 |
| 3,103,072 | 9/1963 | Golley et al. | 33—143 |
| 2,184,035 | 12/1939 | Buccicone | 33—147 |
| 2,659,182 | 11/1953 | Argle | 33—147 |

HARRY N. HAROIAN, *Primary Examiner.*

U.S. Cl. X.R.

33—148, 178